United States Patent
Nakashima et al.

(10) Patent No.: US 7,838,136 B2
(45) Date of Patent: Nov. 23, 2010

(54) GLASS FOR INFORMATION RECORDING MEDIA SUBSTRATE, GLASS SUBSTRATE FOR MAGNETIC DISK AND MAGNETIC DISK

(75) Inventors: Tetsuya Nakashima, Tokyo (JP); Kei Maeda, Tokyo (JP); Noriaki Shimodaira, Tokyo (JP); Atsuyoshi Takenaka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/256,172

(22) Filed: Oct. 22, 2008

(65) Prior Publication Data

US 2009/0110963 A1     Apr. 30, 2009

(30) Foreign Application Priority Data

Oct. 26, 2007   (JP)   ............... 2007-279257
Apr. 23, 2008   (JP)   ............... 2008-112710

(51) Int. Cl.
*G11B 5/73*     (2006.01)
*C03C 3/087*    (2006.01)

(52) U.S. Cl. .................. 428/846.9; 428/410; 65/30.14
(58) Field of Classification Search .......... 501/5, 501/7, 4, 14, 15, 55, 66, 59, 70, 108; 65/17.1, 65/29.21, 30.14, 64, 66; 428/846.3, 846.9, 428/848, 409, 410; 365/232, 222
See application file for complete search history.

(56) References Cited

U.S. PATENT DOCUMENTS

| | | | | |
|---|---|---|---|---|
| 4,944,986 | A | * | 7/1990 | Zuel ............... 428/410 |
| 5,846,278 | A | * | 12/1998 | Jantzen et al. ....... 65/17.1 |
| 6,132,843 | A | * | 10/2000 | Kuroda et al. ....... 428/64.1 |
| 6,251,812 | B1 | | 6/2001 | Koyama et al. |
| 6,313,052 | B1 | | 11/2001 | Nakashima et al. |
| 6,387,510 | B1 | | 5/2002 | Nakashima et al. |
| 6,818,576 | B2 | | 11/2004 | Ikenishi et al. |
| 6,949,485 | B2 | | 9/2005 | Nakashima et al. |
| 2003/0109370 | A1 | * | 6/2003 | Ikenishi et al. ......... 501/66 |
| 2009/0137379 | A1 | * | 5/2009 | Nagai et al. ........... 501/70 |

FOREIGN PATENT DOCUMENTS

| | | | |
|---|---|---|---|
| JP | 2000-351649 | * | 12/2000 |
| JP | 2002-358626 | | 12/2002 |
| JP | 2006-290704 | | 10/2006 |
| WO | WO 2008/062847 A1 | | 5/2008 |

OTHER PUBLICATIONS

Translation Nakaima et al Dec. 2000, JP 2000-351649.*

* cited by examiner

*Primary Examiner*—Kevin M. Bernatz
*Assistant Examiner*—Louis Falasco
(74) *Attorney, Agent, or Firm*—Oblon, Spivak, McClelland, Maier & Neustadt, L.L.P.

(57) ABSTRACT

To provide a glass for an information recording media substrate, which is excellent in weather resistance.

A glass for an information recording media substrate, which comprises, as represented by mol % based on oxide, from 61 to 66% of $SiO_2$, from 11.5 to 17% of $Al_2O_3$, from 8 to 16% of $Li_2O$, from 2 to 8% of $Na_2O$, from 2.5 to 8% of $K_2O$, from 0 to 6% of $MgO$, from 0 to 4% of $TiO_2$ and from 0 to 3% of $ZrO_2$, provided that $Al_2O_3+MgO+TiO_2$ is at least 12%, and $Li_2O+Na_2O+K_2O$ is from 16 to 23%, wherein in a case of where $B_2O_3$ is contained, its content is less than 1%. The above glass for an information recording media substrate, wherein when the glass is left under steam atmosphere at 120° C. at 0.2 MPa for 20 hours, and the amount of Li, the amount of Na and the amount of K, which precipitate on a surface of the glass are represented as $C_{Li}$, $C_{Na}$ and $C_K$ respectively, $C_{Na}$ is at most 0.7 $nmol/cm^2$, and $C_{Li}+C_{Na}+C_K$ is at most 3.5 $nmol/cm^2$.

8 Claims, No Drawings

GLASS FOR INFORMATION RECORDING MEDIA SUBSTRATE, GLASS SUBSTRATE FOR MAGNETIC DISK AND MAGNETIC DISK

The present invention relates to a glass to be used for an information recording media substrate such as a magnetic disk (hard disk), a glass substrate for a magnetic disk and a magnetic disk.

Glass substrates are widely used as substrates for information recording media, particularly for magnetic disks, and a commercially available glass substrate has been known, which contains, as the composition represented by mol %, $SiO_2$: 65.4%, $Al_2O_3$: 8.6%, $Li_2O$: 12.5%, $Na_2O$: 10.5% and $ZrO_2$: 3.0%. This commercially available glass is chemically strengthened for use.

On the other hand, in Patent Document 1, a substrate glass for a magnetic disk, on which no chemical strengthening is carried out, has been proposed.

Patent Document 1: JP-A-2002-358626 (Tables 1 to 14)

A glass substrate for a magnetic disk is required to have a property such that a film such as a base film, a magnetic film or a protective film, which is formed on the substrate, is prevented from peeling due to remarkable change of a surface condition during storage, namely it is required to have weather resistance. Alkali metal components such as Li, Na and K are widely used as a glass melt accelerator. However, such components are selectively extracted from glass with moisture in air, and they are finally reacted with a component such as carbonic acid gas or sulfur dioxide gas and attach on a glass surface in the form of an alkali metal carbonate or an alkali metal sulfate (white stain). Therefore, it is required to prevent such a reaction.

Further, if an alkali metal component diffuses to a magnetic film, a phenomenon such that recorded information is erased tends to occur. Therefore, there is a problem that reliability of recording media is impaired. Particularly, it is considered that Na is most diffusible to a magnetic film. Namely, Na has a low electric field strength (electric charge strength to ion radius) as compared to Li, and a small ion radius as compared to K, and thus is considered to be a relatively more mobile ion.

The present inventors have considered that such a problem is brought about by glass in which the amount of precipitation of Na in the weather resistance test is large, and in order to solve such a problem, the present invention has been accomplished.

The present invention provides a glass for an information recording media substrate, which comprises, as represented by mol % based on oxide, from 61 to 66% of $SiO_2$, from 11.5 to 17% of $Al_2O_3$, from 8 to 16% of $Li_2O$, from 2 to 8% of $Na_2O$, from 2.5 to 8% of $K_2O$, from 0 to 6% of MgO, from 0 to 4% of $TiO_2$ and from 0 to 3% of $ZrO_2$, provided that $Al_2O_3$+MgO+$TiO_2$ is at least 12%, and $Li_2O$+$Na_2O$+$K_2O$ is from 16 to 23%, wherein in a case where $B_2O_3$ is contained, its content is less than 1%.

Here, for example, containing "from 0 to 6% of MgO" means that although MgO is not essential, at most 6% of MgO may be contained.

Further, in a case where at least one alkaline earth metal oxide selected from the group consisting of CaO, SrO and BaO is contained, the present invention provides the glass for an information recording media substrate which contains such an alkaline earth metal oxide in a total content of at most 1%.

Further, the present invention provides the glass for an information recording media substrate which contains no $B_2O_3$.

Further, the present invention provides a glass substrate for a magnetic disk, which is made of the glass for an information recording media substrate.

Further, the present invention provides a magnetic disk, which comprises the glass substrate for a magnetic disk and a magnetic recording layer formed thereon.

The present inventors conducted the after-mentioned weather resistance test on the above-mentioned commercially available chemical strengthened glass, and the result was that the amount of Na precipitation of $C_{Na}$ was 0.84 nmol/cm$^2$, and the total amount of Li, Na and K precipitation of $C_{Li}$+$C_{Na}$+$C_K$ was 3.5 nmol/cm$^2$ (after-mentioned Example 32). The result of the weather resistance test on non-chemical strengthened glass was such that $C_{Na}$ was 3.2 nmol/cm$^2$, and $C_{Li}$+$C_{Na}$+$C_K$ was 18.3 nmol/cm$^2$ (after-mentioned Example 33). It is evident that the weather resistance of the non-chemical strengthened glass is low, and the weather resistance can be improved by the chemical strengthening treatment. Namely, it is considered that this glass can be used as a glass substrate for a magnetic disk only with the chemical strengthening treatment, and the reason is considered to be such that the amount of an alkali component having a large ion radius increases on the glass surface along with the chemical strengthening treatment, and the mobility is reduced. However, there are problems such that the chemical strengthening treatment increases, the number of manufacturing steps, thus leading to an increase of cost, and the substrate surface tends to be stained by the chemical strengthening treatment. Further, since the Na precipitation amount of this chemical strengthened glass is large, its diffusion to the magnetic film is large, and the reliability is low.

On the other hand, most of the compositions exemplified in Patent Document 1 contain at least 1 mol % of $B_2O_3$ in addition to an alkali metal component. $B_2O_3$ is added in order to e.g. lower the brittleness of glass, lower the specific gravity or improve the melting property of glass. However, if $B_2O_3$ coexists with an alkali metal component, an alkali metal borate compound having an extremely low vapor pressure is formed, and the alkali metal borate component volatilizes and diffuses from glass melt vigorously. Due to such a phenomenon, non-homogeneity such as striation occurs, and the quality of glass deteriorates, and at the same time, there are problems that volatilized materials are condensed on refractories used for a glass melting furnace, and refractory strength is thereby substantially lowered, and enormous cost is required to recover volatilized substances.

Further, in Patent Document 1, four compositions containing no $B_2O_3$ are mentioned, however, since Na content of each glass is high, it is considered that $C_{Na}$ is at least 0.7 nmol/cm$^2$. In fact, Example 34 given hereinafter corresponds to the glass of Example 63 in Patent Document 1, and its $C_{Na}$ is 0.74 nmol/cm$^2$. Therefore, it is worried that Na diffusion to a magnetic film increases, and the reliability is lowered.

According to the present invention, without carrying out a chemical strengthening treatment, it is possible to obtain a glass for an information recording media substrate, wherein the Na precipitation amount and the total alkali precipitation amount after the weather resistance test are low. Therefore, a film formed on the substrate such as a base film, a magnetic film or a protective film is prevented from peeling.

Further, it is possible to prevent Na from diffusing to a magnetic film, and highly reliable recoding media can be obtained.

Further, without carrying out a chemical strengthening treatment, a glass substrate for an information recording media can be produced, whereby a process step can be reduced, and the problem of stain on the substrate surface after the chemical strengthening treatment can be solved.

Further, since glass having a high acid resistance can be obtained, surface roughening can be prevented in a polishing step or a washing step under low pH, whereby a high quality glass for an information recording media substrate can be obtained.

Further, it is possible to obtain a glass for an information recording media substrate which has a high Young's modulus and a high specific modulus. Therefore, warpage, deflection or fluttering during disk rotation can be prevented, whereby a recording media having a high recording density can be obtained.

Further, it is possible to obtain a glass for an information recording media substrate having a low density, whereby the motor load during disk rotation can be lowered, an it is possible to accomplish reduction of the power consumption.

Further, it is possible to obtain a glass for an information recording media substrate which has a high linear expansion coefficient. Therefore, matching in thermal expansion with other drive members made of metal becomes better, the stress caused by temperature change becomes low, substrate fracture, etc. are prevented.

Further, it is possible to obtain a glass for an information recording media substrate which has a high strength. Therefore, the probability of fracture at a time of producing media or a drive or the probability of substrate fracture when a drive is shocked is low.

Further, it is possible to obtain a glass for an information recording media substrate which has a low devitrification temperature, compared with its working temperature. Therefore, continuous forming is possible such as a float process, a fusion method or a down draw method, whereby mass production is possible.

Further, it is possible to obtain a glass for an information recording media substrate which has a high glass transition temperature. Therefore, the temperature for heat treatment which is carried out after forming a magnetic film on the substrate can be set high, whereby it is possible to obtain an information recording media having a high recording density.

The density (d) of the glass for an information recording media substrate of the present invention (hereinafter referred to as the glass of the present invention) is preferably at most 2.50 g/cm$^3$. If the density exceeds 2.50 g/cm$^3$, motor load during disk rotation becomes high, and power consumption becomes large. Further, disk rotation is likely to be unstable. The density is preferably at most 2.49 g/cm$^3$.

The glass of the present invention preferably has a Young's modulus (E) of at least 80 GPa and a specific modulus (E/d) of at least 32 MNm/kg. If E is lower than 80 GPa, or the specific modulus is lower than 32 MNm/kg, the glass tends to warp or deflect or flutter during disk rotation, and it may be difficult to obtain information recording media having high recording density. E is more preferably at least 81 Gpa, and E/d is more preferably at least 32.5 MNm/Kg.

The glass transition temperature (Tg) of the glass of the present invention is preferably at least 520° C. If Tg is lower than 520° C., the temperature for the heat treatment for forming a magnetic layer cannot be made sufficiently high, and it may be difficult to increase the magnetic coercive force of the magnetic layer. Tg is more preferably at least 525° C.

In the glass of the present invention, $(T_L-T_4)$ is preferably less than 50° C., where $T_L$ is the liquidus temperature, and $T_4$ is the temperature at which the viscosity becomes $10^4$ dPa·s (working temperature). If $(T_L-T_4)$ is 50° C. or more, it may be difficult to manufacture the glass with a float process. $(T_L-T_4)$ is more preferably less than 40° C., particularly preferably less than 30° C.

The glass of the present invention preferably has a linear expansion coefficient ($\alpha$) of at least $85\times10^{-7}$/° C. in a temperature range of from 50 to 350° C. If $\alpha$ is lower than $85\times10^{-7}$/° C., the difference in the thermal expansion coefficient from other members such as a drive made of metal becomes large, and the substrate tends to fracture is due to a stress caused by temperature change. $\alpha$ is more preferably at least $88\times10^{-7}$/° C. Typically, $\alpha$ is at most $100\times10^{-7}$/° C.

The crack formation ratio (p) measured by the after-mentioned method is preferably at most 50% in the glass of the present invention. If p exceeds 50%, the glass strength is insufficient, and the fracture probability at a time of producing media or drives or the probability of substrate fracture when a drive is shocked, may be high. p is more preferably at most 40%, particularly preferably at most 30%.

Further, when p is low, the glass surface is not likely to be scratched, whereby stress concentration tends to hardly occur, and brittle fracture by weak stress tends to hardly occur or reduced.

When the glass of the present invention is left under steam atmosphere at 120° C. at 0.2 MPa for 20 hours, and the amount of Li, the amount of Na and the amount of K, which precipitate on a surface of the glass are represented as $C_{Li}$, $C_{Na}$ and $C_K$ respectively, $C_{Na}$ is preferably at most 0.7 nmol/cm$^2$, and $C_R=C_{Li}+C_{Na}+C_K$ is preferably at most 3.5 nmol/cm$^2$.

If $C_{Na}$ exceeds 0.7 nmol/cm$^2$, Na diffusion to a magnetic film formed on the substrate increases, and the reliability of information recording media may be lowered. $C_{Na}$ is more preferably at most 0.5 nmol/cm$^2$, particularly preferably at most 0.4 nmol/cm$^2$.

If $C_R$ exceeds 3.5 nmol/cm$^2$, a film formed on the substrate, such as a base film, a magnetic film and a protective film is likely to be peeled. $C_R$ is more preferably at most 3.2 nmol/cm$^2$, particularly preferably at most 3.0 nmol/cm$^2$.

It is preferred that the glass of the present invention is excellent in acid resistance such that when the glass is immersed in 0.1 N nitric acid at 25° C. for 24 hours, peel-off breakage is not formed on the glass surface, or the following nitric acid etching amount is at most 6 nm. Otherwise, in a case where a strong acid having a pH of from 1 to 2 is used in a surface polishing step or final washing step in the production process of information recording media, particularly the production process of substrate glass for a magnetic disk, the glass surface may be roughened or peel-broken. The nitric acid etching amount is more preferably at most 1.5 nm, particularly preferably at most 1.2 nm.

The nitric acid etching amount: A sample to be measured is prepared by polishing a glass plate into mirror surface having a thickness of from 1 to 2 mm and a size of 4 cm×4 cm. The sample is immersed in 0.01 N nitric acid at 25° C. for 3 hours, and an Si amount eluted into the nitric acid is analyzed and measured by ICP-OES. The nitric acid etching amount is calculated from the Si amount to be obtained, the $SiO_2$ content in the glass and the density of the glass.

Next, the composition of the glass of the present invention is explained by employing mol % representation.

$SiO_2$ is a component for forming the glass structure and an essential component. If the content of $SiO_2$ is less than 61%, the acid resistance and weather resistance become low, d tends to be large, the glass tends to be brittle, or $T_L$ increases whereby the glass becomes unstable. Further, if the content of $SiO_2$ is insufficient in glass having a large amount of an alkali metal component such as the glass of the present invention, the alkali metal component is selectively eluted from the surface by immersing in acids, a low expansible layer tends to be formed, and consequently, the glass surface tends to break and exfoliate after the immersion with an acid, namely the acid resistance may deteriorate. Further, in a case where the glass is polished by using an acidic colloidal silica slurry, if the content of $SiO_2$ is less than 61%, it may be difficult to decrease its surface roughness Ra. The content of $SiO_2$ is preferably at least 61.5%. In a case where it is desired to increase the acid resistance more, the content of $SiO_2$ is preferably at least 62%, more preferably 62.5%, particularly preferably at least 63.5%. If the content of $SiO_2$ exceeds 66%, the after-mentioned $T_2$ and $T_4$ raise, and it is difficult to melt and form glass, E or E/d decreases, or a decreases. The content of $SiO_2$ is preferably at most 65%.

$Al_2O_3$ has an effect to improve weather resistance and is an essential component. If the content of $Al_2O_3$ is at most 11.5%, the above effect is a little, E or E/d decreases, or Tg tends to be low. The content of $Al_2O_3$ is preferably at least 12%. If the content of $Al_2O_3$ exceeds 17%, the after-mentioned $T_2$ and $T_4$ raise, and it is difficult to melt and form glass, α decreases, or $T_L$ becomes too high. The content of $Al_2O_3$ is preferably at most 16%. In a case where it is desired to increase the acid resistance more, the content of $Al_2O_3$ is preferably at most 15%, more preferably at most 14%.

In a case where it is desired to increase the acid resistance particularly, the content of $SiO_2$ is preferably at least 63.5%, and the content of $Al_2O_3$ is preferably at most 14%.

$Li_2O$ has an effect to increase E, E/d or α, or improve the melting property of glass and is an essential component. If the content of $Li_2O$ is less than 8%, the above effect is low. The content of $Li_2O$ is preferably at least 9%, more preferably at least 10%. If the content of $Li_2O$ exceeds 16%, the acid resistance or weather resistance deteriorates, or Tg tends to be low. The content of $Li_2O$ is preferably at most 15%, more preferably at most 14%, typically at most 13%.

$Na_2O$ has an effect to increase α or improve the melting property of glass and is an essential component. If the content of $Na_2O$ is less than 2%, the above effect is low. The content of $Na_2O$ is preferably at least 3%. If the content of $Na_2O$ exceeds 8%, the acid resistance or weather resistance deteriorates, or Tg tends to be low. The content of $Na_2O$ is preferably at most 7.5%, more preferably at most 7%.

$K_2O$ has an effect to increase a or improve the melting property of glass and is an essential component. If the content of $K_2O$ is less than 2.5%, the above effect is low. Further, if it is attempted to set the content of $K_2O$ to be less than 2.5%, and increase the content of $Na_2O$ in order to maintain α, the weather resistance deteriorates. The content of $K_2O$ is preferably at least 3%. If the content of $K_2O$ exceeds 8%, the acid resistance or weather resistance deteriorates, or E or E/d tends to be low. The content of $K_2O$ is preferably at most 6%, more preferably at most 5%.

If the total content of $Li_2O$, $Na_2O$ and $K_2O$ ($R_2O$) is less than 16%, α decreases, or the melting property of glass deteriorates. $R_2O$ is preferably at least 17%, more preferably at least 18%, particularly preferably at least 19%. If $R_2O$ exceeds 23%, the acid resistance or weather resistance deteriorates. $R_2O$ is preferably at most 22%, more preferably at most 21%.

Although MgO is not essential, it has an effect to increase E, E/d or α, prevent the glass from being brittle or improve the melting property of glass, while maintaining weather resistance. Therefore, at most 6% of MgO may be contained. If the content of MgO exceeds 6%, $T_L$ tends to be too high. The content of MgO is preferably at most 5%, more preferably at most 4%. In a case where MgO is contained, its content is typically at least 1%.

Although $TiO_2$ is not essential, it has an effect to increase E, E/d or Tg or improve the weather resistance. Therefore, at most 4% of $TiO_2$ may be contained. If the content of $TiO_2$ exceeds 4%, $T_L$ tends to be too high, or a phase separation phenomenon tends to occur. The content of $TiO_2$ is preferably at most 3%, more preferably at most 2%. In a case where $TiO_2$ is contained, its content is preferably at least 0.3%, more preferably at least 0.6%, typically at least 0.8%.

If the total content of $Al_2O_3$, MgO and $TiO_2$ is less than 12%, it is difficult to increase E or E/d, while maintaining the weather resistance.

Although $ZrO_2$ is not essential, it has an effect to increase E, E/d, raise Tg or improve the melting property of glass, while maintaining the weather resistance. Therefore, at most 3% of $ZrO_2$ may be contained. If the content of $ZrO_2$ exceeds 3%, d increases, the glass tends to be brittle, or $T_L$ tends to be too high. The content of $ZrO_2$ is preferably at most 2%, typically at most 1%.

The glass of the present invention basically comprises the above components, however, other components may be contained so long as the object of the present invention is not impaired. In such a case, the total content of other components is preferably at most 5%, typically at most 2%.

For example, since CaO, SrO or BaO has an effect to increase α while maintaining the weather resistance, or improve the melting property of glass, at most 1% in the total may be contained. If it exceeds 1%, d tends to be high, or the glass tends to be brittle. The total content is preferably at most 0.75%, typically at most 0.5%.

Further, a refining agent such as $SO_3$, Cl, $AS_2O_3$, $Sb_2O_3$ or $SnO_2$ may be contained up to 2% in total.

Further, a colorant such as $Fe_2O_3$, $Co_3O_4$ or NiO may be contained up to 2% in total.

Further, if $B_2O_3$ coexists with an alkali metal component, it is likely to volatilize. Therefore, it is preferred not to contain $B_2O_3$. Even if $B_2O_3$ is contained, its content is less than 1%, preferably less than 0.5%.

A glass substrate for information recording media made of the glass of the present invention is usually a circular glass plate.

In a case where the information recording medium is a magnetic disk, the glass substrate for the information recording medium is the glass substrate for an magnetic disk of the present invention.

The glass substrate for an magnetic disk is widely used for a 2.5 inch substrate (outside diameter of a is glass substrate: 65 mm) used for laptop computers, etc. or a 1.8 inch substrate (outside diameter of a glass substrate: 48 mm) used for portable MP3 players, etc., and its market is expanding year by year, while it is demanded to supply the glass substrate at low price.

Mass production of plate glass is widely carried out by a continuous forming method such as a float process, a fusion method or a down draw method. Since the glass of the present invention is glass which can be formed by a float process as mentioned above, the glass of the present invention is preferred for mass production.

The methods for producing the glass of the present invention and the glass substrate of the present invention are not particularly restricted, and various methods can be applied. For example, materials of respective components to be usually used are measured and mixed so as to constitute the desired composition and then heat-melted in a glass melting furnace. The glass is homogenized by bubbling, stirring, adding a refining agent or the like, then formed by a conventional method such as a float process, a press method, a fusion method or a down draw method and annealed. Then, as a case requires, processing such as grinding or polishing is carried out to form a glass substrate having a predetermined size and shape. The forming method is particularly preferably a float process, which is suitable for mass production. Further, a continuous forming method other than a float process, namely a fusion method or a down draw method is also preferred.

EXAMPLES

Materials of respective components were measured and mixed so as to constitute the compositions represented by mol % in the rows for from $SiO_2$ to $ZrO_2$ in Tables and melted in a platinum crucible at a temperature of from 1,550 to 1,600° C. for 3 to 5 hours. At the time of melting, a platinum stirrer was inserted in molten glass, and the molten glass was stirred for 2 hours to homogenize glass. Then, the molten glass was flown out, formed into a plate and annealed to room temperature at a cooling rate of 1° C./minute. Further, in Tables, Al+Mg+Ti represents the total content (unit: mol %) of $Al_2O_3$, MgO and $TiO_2$, and $R_2O$ represents the total content (unit: mol %) of $Li_2O$, $Na_2O$ and $K_2O$.

Glasses of Examples 1 to 31 are Examples of the present invention, and glasses of Examples 32 to 41 are Comparative Examples. Further, glass of Example 32 is the same as the above-mentioned commercially available chemical strengthened glass, and it is produced by chemical strengthening of the glass of Example 33.

With respect to the glass plates thus obtained, density d (unit: g/cm$^3$), the above-mentioned average linear expansion coefficient α (unit×10$^{-7}$/° C.), Young's modulus E (unit: GPa), specific modulus E/d (unit: MNm/kg), glass transition temperature Tg (unit: ° C.), liquidus temperature $T_L$ (unit: ° C.), temperature at which the viscosity becomes $10^2$ dPa·s $T_2$ (unit: ° C.), temperature at which the viscosity becomes $10^4$ dPa·s $T_4$ (unit: ° C.), the above-mentioned $C_{Na}$ (unit: nmol/cm$^2$), the above-mentioned $C_R$ (unit: nmol/cm$^2$), crack forming probability p (unit: %), the above-mentioned acid resistance and the above-mentioned nitric acid etching amount were measured by the following methods. The results are shown in Tables, and "-" in Tables means "not measured".

d: d was measured by Archimedes' method by using 20 to 50 g of glass having no bubble.

α: By using a differential thermal dilatometer and quartz glass as a reference material, the degree of elongation of glass at a time of raising the temperature from room temperature at a rate of 5° C./minute was measured until the temperature at which glass softened, and elongation was no longer observed, namely the yield point, and an average linear expansion coefficient in a temperature range of from 50 to 350° C. was calculated from the obtained thermal expansion curve.

E: With respect to a glass plate having a thickness of from 5 to 10 mm and a size of 3 cm×3 cm, E was measured by an ultrasonic pulse-echo method.

Tg: By using a differential thermal dilatometer and quartz glass as a reference material, the degree of elongation of glass at a time of raising the temperature from room temperature at a rate of 5° C./minute was measured until the yield point, and a temperature at a critical point on the obtained thermal expansion curve was determined as a glass transition temperature.

$T_L$: Glass was pulverized by a mortar to glass particles having a particle size of about 2 mm, the glass particles were lined up on a platinum board and heat-treated in a temperature gradient furnace for 24 hours. The highest temperature of the glass particles wherein crystal precipitated was determined as a liquidus temperature. Further, for example, "≦1080° C." means at most 1,080° C.

$T_2$ and $T_4$: $T_2$ and $T_4$ were measured by a rotation viscometer.

$C_{Na}$ and $C_R$: Both surfaces of a glass plate having a thickness of from 1 to 2 mm and a size of 4 cm×4 cm were mirror-polished with cerium oxide and washed with calcium carbonate and a detergent, and then the glass plate was put in a highly accelerated stress test system (unsaturated type pressure cracker EHS-411M, manufactured by ESPEC Corp.) and left under a steam atmosphere at 120° C. and 0.2 MPa for 20 hours. The tested sample and 20 ml of ultra pure water were put in a washed plastic bag provided with a zipper, a surface precipitate was dissolved with applying ultrasonic wave for 10 minutes, and respective alkali components of eluates were quantified by using ICP-MS. The amount of such eluate was converted to mol and normalized with the surface area of the test sample.

p: In a room controlled at 23° C. and a relative humidity of 70%, Vickers indenters were loaded at 500 gf into a surface of a mirror-polished glass plate having a thickness of from 1 to 2 mm and a size of 4 cm×4 cm, and the number of cracks formed from the four edges of Vickers indenters was measured. This measurement was repeated 10 times, and 100× (the total number of formed cracks)/40 was determined as a crack forming probability.

Acid resistance: Glass was immersed in a 0.1 N nitric acid at 25° C. for 24 hours, and a glass surface was observed by a differential interference microscope. Glass on which peeling break was observed was judged as X, and glass on which peeling break was not observed was judged as ○. The results are shown in the row for "Acid resistance 1".

Nitric acid etching amount: The nitric acid etching amount was observed by the above-mentioned method (unit: nm). The results are shown in the row for "Acid resistance 2".

Further, respective glass plates made of the glasses of Examples 8, 27, 30 and 31, which are Example of the present invention and Examples 34 and 35, which are Comparative Examples were polished with acidic colloidal silica slurry, and their surface roughness Ra (unit: nm) was measured. Namely, a glass plate having a size of 4 cm×4 cm was prepared, and both surfaces were mirror-polished with cerium oxide and then polished with colloidal silica slurry adjusted to pH=2 and having an average particle size of 30 nm by a small polishing apparatus equipped with a suede type urethane pad at a pressure of 10 kPa for 10 minutes. Immediately after the polishing, the glass plate was taken out and washed with an alkali detergent and pure water, followed by measuring the surface roughness Ra by an atomic force microscope (AFM). The results are shown in the row for "Ra". For a glass plate for a magnetic disk, Ra is preferably at most 0.15 nm.

From the result of the measurements, it is evident that in Examples 8, 27, 30 and 31 wherein the content of $SiO_2$ is at least 61%, Ra is from 0.11 to 0.13 nm, while in Examples 35 and 34 wherein the content of $SiO_2$ is 60.7% and 60.0% respectively, Ra is 0.19 nm and 0.29 nm. Therefore, it is evident that when the content of $SiO_2$ is lower than 61%, the lower the content of $SiO_2$ is, the higher the Ra is.

Further, in the mass production of a glass substrate for a magnetic disk, after polishing, a glass plate is left in a colloidal silica slurry in some cases, without being taken out immediately. As a simulated test for such a case, the glass plate taken out immediately after polishing was immersed in a colloidal silica slurry adjusted to pH=2 for 10 minutes and washed in the same manner as above, and then its surface roughness was measured. The results are shown in the row for Ra' (unit: nm).

From the results, it is evident that in Examples 8, 27, 30 and 31 wherein the content of $SiO_2$ is at least 61%, Ra' is from 0.12 to 0.15 nm, and in these Examples, increasing the surface roughness due to immersion in the colloidal silica slurry is none or little. On the other hand, in Examples 35 and 34 wherein the content of $SiO_2$ is 60.7% and 60.0% respectively, Ra' is at least 1.0 nm, and it is evident that the surface roughness was remarkably increased. Namely, the glass of the present invention is preferred for mass production of a glass plate for a magnetic disk.

TABLE 1

|  | Examples | | | | | | | |
| --- | --- | --- | --- | --- | --- | --- | --- | --- |
|  | 1 | 2 | 3 | 4 | 5 | 6 | 7 | 8 |
| $SiO_2$ | 63.7 | 63.7 | 63.7 | 64.7 | 61.7 | 61.0 | 62.7 | 61.9 |
| $Al_2O_3$ | 13.0 | 13.0 | 13.0 | 13.0 | 13.0 | 13.0 | 13.0 | 13.0 |
| $Li_2O$ | 10.2 | 11.2 | 12.2 | 11.2 | 11.2 | 13.2 | 11.1 | 10.7 |
| $Na_2O$ | 6.5 | 6.5 | 6.5 | 6.5 | 6.5 | 5.2 | 5.9 | 6.8 |
| $K_2O$ | 3.0 | 3.0 | 3.0 | 3.0 | 3.0 | 3.0 | 2.7 | 3.0 |
| MgO | 0 | 0 | 0 | 0 | 3.0 | 3.0 | 3.0 | 3.0 |
| $TiO_2$ | 2.0 | 1.0 | 0 | 1.0 | 1.0 | 1.0 | 1.0 | 1.0 |
| $ZrO_2$ | 1.6 | 1.6 | 1.6 | 0.6 | 0.6 | 0.6 | 0.6 | 0.6 |
| Al + Mg + Ti | 15.0 | 14.0 | 13.0 | 14.0 | 17.0 | 17.0 | 17.0 | 17.0 |
| $R_2O$ | 19.7 | 20.7 | 21.7 | 20.7 | 20.7 | 21.4 | 19.7 | 20.5 |
| d | 2.49 | 2.48 | 2.47 | 2.45 | 2.47 | 2.47 | 2.46 | 2.47 |
| α | 90 | — | — | — | 94 | — | 93 | 95 |
| E | 82.8 | 83.5 | 83.6 | 82.1 | 83.5 | 84.4 | 83.2 | 83.0 |
| E/d | 33.3 | 33.7 | 33.8 | 33.5 | 33.8 | 34.2 | 33.8 | 33.6 |
| Tg | 564 | — | — | — | 532 | — | 542 | 530 |
| $T_L$ | — | — | — | ≦1080 | ≦1000 | 1020 | — | ≦960 |
| $T_2$ | — | — | — | — | — | — | — | 1565 |
| $T_4$ | — | — | — | — | — | — | — | 1087 |
| $C_{Na}$ | — | — | — | — | — | — | — | 0.32 |
| $C_R$ | — | — | — | — | — | — | — | 2.9 |
| p | — | — | — | — | — | — | — | 10 |
| Acid resistance 1 | — | — | — | — | — | — | — | ○ |
| Acid resistance 2 | — | — | — | 0.80 | — | — | — | 4.9 |
| Ra | — | — | — | — | — | — | — | 0.11 |
| Ra' | — | — | — | — | — | — | — | 0.14 |

TABLE 2

|  | Examples | | | | | | | |
| --- | --- | --- | --- | --- | --- | --- | --- | --- |
|  | 9 | 10 | 11 | 12 | 13 | 14 | 15 | 16 |
| $SiO_2$ | 61.9 | 63.1 | 63.1 | 62.0 | 62.0 | 61.9 | 61.9 | 62.0 |
| $Al_2O_3$ | 13.0 | 13.0 | 13.0 | 13.0 | 13.0 | 13.0 | 13.0 | 13.0 |
| $Li_2O$ | 10.7 | 9.7 | 9.7 | 11.1 | 11.1 | 9.0 | 9.0 | 11.0 |
| $Na_2O$ | 6.8 | 7.1 | 7.1 | 5.5 | 5.5 | 5.3 | 5.3 | 3.0 |
| $K_2O$ | 3.0 | 2.5 | 2.5 | 3.8 | 3.8 | 4.4 | 4.4 | 5.7 |
| MgO | 3.6 | 3.0 | 3.6 | 3.0 | 3.6 | 4.8 | 5.4 | 3.7 |
| $TiO_2$ | 1.0 | 1.0 | 1.0 | 1.0 | 1.0 | 1.0 | 1.0 | 1.0 |
| $ZrO_2$ | 0 | 0.6 | 0 | 0.6 | 0 | 0.6 | 0 | 0.6 |
| Al + Mg + Ti | 17.6 | 17.0 | 17.6 | 17.0 | 17.6 | 18.8 | 19.4 | 17.7 |
| $R_2O$ | 20.5 | 19.3 | 19.3 | 20.4 | 20.4 | 18.7 | 18.7 | 19.7 |
| d | 2.46 | 2.47 | 2.45 | 2.47 | 2.45 | 2.47 | 2.46 | 2.46 |
| α | 93 | 91 | 91 | 93 | — | 90 | — | 90 |
| E | 82.5 | 82.9 | 82.2 | 82.8 | 82.3 | 82.2 | 81.8 | 82.0 |
| E/d | 33.6 | 33.6 | 33.5 | 33.6 | 33.5 | 33.3 | 33.3 | 33.3 |
| Tg | 522 | 543 | 534 | 531 | — | 553 | — | 545 |
| $T_L$ | ≦1080 | 980 | ≦1080 | ≦1080 | ≦1080 | ≦1080 | — | — |
| $T_2$ | — | — | — | — | — | — | — | — |
| $T_4$ | — | — | — | — | — | — | — | — |
| $C_{Na}$ | — | 0.24 | — | 0.22 | — | 0.25 | — | 0.09 |
| $C_R$ | — | 2.8 | — | 2.7 | — | 2.3 | — | 2.6 |
| p | — | 15 | — | 10 | — | 15 | — | 10 |
| Acid resistance 1 | — | ○ | — | ○ | — | ○ | — | ○ |
| Acid resistance 2 | — | — | — | — | — | — | — | — |
| Ra | — | — | — | — | — | — | — | — |
| Ra' | — | — | — | — | — | — | — | — |

TABLE 3

| | Examples | | | | | | | |
|---|---|---|---|---|---|---|---|---|
| | 17 | 18 | 19 | 20 | 21 | 22 | 23 | 24 |
| $SiO_2$ | 62.0 | 62.0 | 62.0 | 61.9 | 61.9 | 62.9 | 64.5 | 64.5 |
| $Al_2O_3$ | 13.0 | 15.0 | 15.0 | 13.0 | 13.0 | 13.0 | 12.0 | 12.0 |
| $Li_2O$ | 13.0 | 11.0 | 11.0 | 10.7 | 13.7 | 10.7 | 11.6 | 10.2 |
| $Na_2O$ | 3.0 | 6.0 | 4.0 | 3.8 | 3.8 | 6.8 | 6.7 | 7.7 |
| $K_2O$ | 5.0 | 3.6 | 5.1 | 6.0 | 3.0 | 3.0 | 2.7 | 2.7 |
| MgO | 2.4 | 1.0 | 1.4 | 3.0 | 3.0 | 3.0 | 0 | 0 |
| $TiO_2$ | 1.0 | 1.0 | 1.0 | 1.0 | 1.0 | 0 | 1.0 | 0.9 |
| $ZrO_2$ | 0.6 | 0.5 | 0.5 | 0.6 | 0.6 | 0.6 | 1.5 | 2.0 |
| Al + Mg + Ti | 16.4 | 17.0 | 17.4 | 17.0 | 17.0 | 16.0 | 13.0 | 12.9 |
| $R_2O$ | 21.0 | 20.6 | 20.1 | 20.5 | 20.5 | 20.5 | 21.0 | 20.6 |
| d | 2.46 | 2.46 | 2.45 | 2.46 | 2.46 | 2.46 | 2.49 | 2.50 |
| α | 93 | 93 | 91 | — | — | — | 94 | 93 |
| E | 82.8 | 82.6 | 81.8 | 81.6 | 84.6 | 82.4 | 82.8 | 82.6 |
| E/d | 33.7 | 33.6 | 33.3 | 33.1 | 34.4 | 33.5 | 33.3 | 33.0 |
| Tg | 530 | 549 | 558 | — | — | — | 533 | 544 |
| $T_L$ | 1000 | 1060 | — | — | — | — | ≦1050 | — |
| $T_2$ | 1560 | 1633 | — | — | — | — | — | — |
| $T_4$ | 1083 | 1146 | — | — | — | — | — | — |
| $C_{Na}$ | 0.07 | 0.16 | 0.08 | 0.24 | 0.05 | 0.34 | 0.33 | 0.45 |
| $C_R$ | 2.7 | 2.6 | 2.4 | 2.9 | 3.3 | 3.2 | 3.4 | 3.3 |
| p | 10 | 10 | 5 | — | — | — | — | — |
| Acid resistance 1 | ○ | ○ | ○ | — | — | — | ○ | ○ |
| Acid resistance 2 | — | — | — | — | — | — | 0.76 | 0.94 |
| Ra | — | — | — | — | — | — | — | — |
| Ra' | — | — | — | — | — | — | — | — |

TABLE 4

| | Examples | | | | | | | |
|---|---|---|---|---|---|---|---|---|
| | 25 | 26 | 27 | 28 | 29 | 30 | 31 | 32 |
| $SiO_2$ | 64.7 | 64.7 | 64.5 | 64.5 | 64.5 | 64.5 | 62.4 | 65.4 |
| $Al_2O_3$ | 13.0 | 12.0 | 13.0 | 12.5 | 12.0 | 12.0 | 13.0 | 8.6 |
| $Li_2O$ | 11.2 | 11.2 | 12.5 | 12.7 | 12.7 | 12.8 | 10.7 | 12.5 |
| $Na_2O$ | 6.5 | 6.5 | 5.5 | 5.8 | 5.8 | 5.5 | 6.8 | 10.5 |
| $K_2O$ | 3.0 | 3.0 | 3.0 | 3.0 | 3.0 | 3.4 | 3.0 | 0 |
| MgO | 0 | 0 | 0 | 0 | 0 | 0 | 2.75 | 0 |
| $TiO_2$ | 0 | 0 | 0 | 0 | 0 | 0 | 0.75 | 0 |
| $ZrO_2$ | 1.6 | 2.6 | 1.5 | 1.5 | 2.0 | 1.8 | 0.6 | 3.0 |
| Al + Mg + Ti | 13.0 | 12.0 | 13.0 | 12.5 | 12.0 | 12.0 | 16.5 | 8.6 |
| $R_2O$ | 20.7 | 20.7 | 21.0 | 21.5 | 21.5 | 21.7 | 20.5 | 23.0 |
| d | 2.47 | 2.49 | 2.46 | 2.46 | 2.48 | 2.47 | 2.47 | — |
| α | 92 | 90 | 91 | 91 | 94 | 91 | 94 | — |
| E | 82.2 | 83.2 | 82.7 | 82.6 | 83.1 | 82.7 | 82.8 | — |
| E/d | 33.3 | 33.4 | 33.6 | 33.5 | 33.6 | 33.5 | 33.6 | — |
| Tg | 542 | 548 | 536 | 527 | 532 | 523 | 529 | — |
| $T_L$ | — | — | — | ≦1000 | 1100 | 1050 | — | — |
| $T_2$ | — | — | — | — | — | 1594 | — | — |
| $T_4$ | — | — | — | — | — | 1093 | — | — |
| $C_{Na}$ | 0.25 | 0.26 | 0.15 | 0.16 | 0.15 | 0.12 | 0.33 | 0.84 |
| $C_R$ | 3.3 | 3.3 | 3.4 | 3.3 | 3.3 | 3.2 | 2.7 | 3.5 |
| p | — | — | — | — | — | — | 10 | — |
| Acid resistance 1 | ○ | ○ | ○ | ○ | ○ | ○ | ○ | ○ |
| Acid resistance 2 | 1.0 | 0.81 | 1.0 | 0.90 | 0.89 | 0.74 | 1.4 | — |
| Ra | — | — | 0.12 | — | — | 0.12 | 0.13 | — |
| Ra' | — | — | 0.12 | — | — | 0.12 | 0.15 | — |

TABLE 5

| | Examples | | | | | | | | |
|---|---|---|---|---|---|---|---|---|---|
| | 33 | 34 | 35 | 36 | 37 | 38 | 39 | 40 | 41 |
| $SiO_2$ | 65.4 | 60.0 | 60.7 | 61.9 | 61.9 | 61.9 | 61.9 | 63.9 | 65.9 |
| $Al_2O_3$ | 8.6 | 15.0 | 13.0 | 13.0 | 13.0 | 13.0 | 13.0 | 11.0 | 9.0 |

TABLE 5-continued

| | Examples | | | | | | | | |
|---|---|---|---|---|---|---|---|---|---|
| | 33 | 34 | 35 | 36 | 37 | 38 | 39 | 40 | 41 |
| $Li_2O$ | 12.5 | 9.0 | 12.2 | 7.7 | 7.7 | 10.7 | 13.7 | 10.7 | 10.7 |
| $Na_2O$ | 10.5 | 9.0 | 6.5 | 6.8 | 9.8 | 9.8 | 6.8 | 6.8 | 6.8 |
| $K_2O$ | 0 | 2.0 | 3.0 | 6.0 | 3.0 | 0 | 0 | 3.0 | 3.0 |
| MgO | 0 | 5.0 | 3.0 | 3.0 | 3.0 | 3.0 | 3.0 | 3.0 | 3.0 |
| $TiO_2$ | 0 | 0 | 1.0 | 1.0 | 1.0 | 1.0 | 1.0 | 1.0 | 1.0 |
| $ZrO_2$ | 3.0 | 0 | 0.6 | 0.6 | 0.6 | 0.6 | 0.6 | 0.6 | 0.6 |
| Al + Mg + Ti | 8.6 | 20.0 | 17.0 | 17.0 | 17.0 | 17.0 | 17.0 | 15.0 | 13.0 |
| $R_2O$ | 23.0 | 20.0 | 21.7 | 20.5 | 20.5 | 20.5 | 20.5 | 20.5 | 20.5 |
| d | — | — | — | — | — | — | — | — | — |
| α | — | — | — | — | — | — | — | — | — |
| E | — | — | — | — | — | — | — | — | — |
| E/d | — | — | — | — | — | — | — | — | — |
| Tg | — | — | — | — | — | — | — | — | — |
| $T_L$ | — | — | — | — | — | — | — | — | — |
| $T_2$ | — | — | — | — | — | — | — | — | — |
| $T_4$ | — | — | — | — | — | — | — | — | — |
| $C_{Na}$ | 3.20 | 0.74 | 0.30 | 0.81 | 0.96 | 0.41 | 0.08 | 0.63 | 1.46 |
| $C_R$ | 18.3 | 3.6 | 3.1 | 2.8 | 3.0 | 3.6 | 3.7 | 4.4 | 6.7 |
| p | — | — | — | — | — | — | — | — | — |
| Acid resistance 1 | ○ | X | X | — | — | — | — | — | — |
| Acid resistance 2 | — | 544 | 89 | — | — | — | — | — | — |
| Ra | — | 0.29 | 0.19 | — | — | — | — | — | — |
| Ra' | — | ≧1.0 | ≧1.0 | — | — | — | — | — | — |

INDUSTRIAL APPLICABILITY

The glass of the present invention can be used as information recording media substrates such as magnetic disk substrates or for producing information recording media substrates such as magnetic disk substrates.

The entire disclosures of Japanese Patent Application No. 2007-279257 filed on Oct. 26, 2007 and Japanese Patent Application No. 2008-112710 filed on Apr. 23, 2008 including specifications, claims and summaries are incorporated herein by reference in their entireties.

What is claimed is:

1. An information recording media, which comprises a glass substrate for a magnetic disk and a magnetic recording layer formed thereon, wherein the glass substrate comprises, as represented by mol % based on oxide;
   from 61 to 66% of $SiO_2$,
   from 11.5 to 17% of $Al_2O_3$,
   from 8 to 16% of $Li_2O$,
   from 2 to 8% of $Na_2O$,
   from 2.5 to 8% of $K_2O$,
   from 0 to 6% of MgO,
   from 0 to 4% of $TiO_2$,
   from 0 to 3% of $ZrO_2$, and
   from 0 to 1% of at least one alkaline earth metal oxide selected from the group consisting of CaO, SrO and BaO;
   provided that $Al_2O_3+MgO+TiO_2$ is at least 12%, and $Li_2O+Na_2O+K_2O$ is from 16 to 23%, and said glass comprises less than 1% of $B_2O_3$,
   wherein when the glass is left under steam atmosphere at 120° C. at 0.2 MPa for 20 hours, and the amount of Li, the amount of Na and the amount of K, which precipitate on a surface of the glass are represented as $C_{Li}$, $C_{Na}$, $C_K$, respectively, $C_{Na}$ is at most 0.7 nmol/cm², and $C_{Li}+C_{Na}+C_K$ is at most 3.5 nmol/cm².

2. An information recording media, which comprises a information recording media according to claim 1, wherein the amount of $SiO_2$ in the glass is at least 63.5%, and $Al_2O_3$ is at most 14%.

3. An information recording media, which comprises a information recording media according to claim 1, wherein the glass comprises no $B_2O_3$.

4. An information recording media, which comprises a information recording media according to claim 1, wherein the glass has a density of at most 2.50 g/cm³.

5. An information recording media, which comprises a information recording media according to claim 1, wherein the glass has a Young's modulus of at least 80 GPa, and a specific modulus of at least 32 MNm/kg.

6. An information recording media, which comprises a information recording media according to claim 1, wherein the glass has an average linear expansion coefficient of at least 85×10⁻⁷/° C. in a temperature range of from 50 to 350° C.

7. An information recording media, which comprises a information recording media according to claim 1, wherein $(T_L-T_4)<50°$ C., where $T_L$ is the liquidus temperature of the glass, and $T_4$ is the temperature at which the viscosity becomes 10⁴ dPa·s.

8. An information recording media, which comprises a information recording media according to claim 1, wherein the glass has a glass transition temperature of at least 520° C.

* * * * *